(12) United States Patent
Miyazawa

(10) Patent No.: US 10,908,416 B2
(45) Date of Patent: Feb. 2, 2021

(54) DISTORTION CORRECTION METHOD, DISTORTION CORRECTION APPARATUS, AND IMAGE PICKUP APPARATUS

(71) Applicant: CANON KABUSHIKI KAISHA, Tokyo (JP)

(72) Inventor: Nobuyuki Miyazawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 15/958,463

(22) Filed: Apr. 20, 2018

(65) Prior Publication Data

US 2018/0307040 A1    Oct. 25, 2018

(30) Foreign Application Priority Data

Apr. 21, 2017   (JP) ................... 2017-084278

(51) Int. Cl.
| | |
|---|---|
| *G02B 27/00* | (2006.01) |
| *G02B 7/10* | (2006.01) |
| *G06T 5/00* | (2006.01) |
| *H04N 5/232* | (2006.01) |
| *G02B 15/173* | (2006.01) |
| *H04N 5/357* | (2011.01) |

(52) U.S. Cl.
CPC ......... *G02B 27/0037* (2013.01); *G02B 7/102* (2013.01); *G02B 15/173* (2013.01); *G02B 27/0025* (2013.01); *G06T 5/006* (2013.01); *H04N 5/23238* (2013.01); *H04N 5/23296* (2013.01); *H04N 5/3572* (2013.01)

(58) Field of Classification Search
CPC ............ G02B 27/0037; G02B 27/0025; G02B 7/102; G02B 15/173; G06T 5/006; H04N 5/23238; H04N 5/23296; H04N 5/3572
USPC ........................................................ 359/642
See application file for complete search history.

(56) References Cited

U.S. PATENT DOCUMENTS

| | | | | |
|---|---|---|---|---|
| 4,509,842 A | * | 4/1985 | Taniguchi | G03B 3/10 396/111 |
| 8,228,396 B2 | | 7/2012 | Hagiwara | |
| 2008/0239107 A1 | * | 10/2008 | Cho | H04N 5/217 348/241 |

FOREIGN PATENT DOCUMENTS

| | | |
|---|---|---|
| JP | 2009043060 A | 2/2009 |
| WO | 2008139577 A1 | 11/2008 |

* cited by examiner

*Primary Examiner* — Thomas K Pham
*Assistant Examiner* — Mitchell T Oestreich
(74) *Attorney, Agent, or Firm* — Rossi, Kimms & McDowell LLP

(57) ABSTRACT

Provided is a distortion correction method for an image pickup mode in which an image pickup is performed with an image pickup area, whose diagonal length is Ib, of an image pickup element which receives light from an optical system, an expression, 1.05<Ia/Ib, being satisfied in a case where a distortion correction is not performed, where Ia represents a diagonal length of an effective pixel area of the image pickup element, wherein distortion correction is performed for an image having a positive distortion so that image information positioned at an image height of Ic/2 is positioned at an image height of Ib/2, and so that a conditional expression, 1.0<Ic/Ib, is satisfied.

14 Claims, 11 Drawing Sheets

DISTORTION CORRECTION METHOD, DISTORTION CORRECTION APPARATUS, AND IMAGE PICKUP APPARATUS

BACKGROUND OF THE INVENTION

Field of the Invention

The present invention relates to a distortion correction method, a distortion correction apparatus, and an image pickup apparatus.

Description of the Related Art

In recent years, while image qualities of image pickup apparatus such as a television (TV) camera, a digital video camera, and a digital still camera are increasing, the image pickup apparatus are also desired to be further downsized and have a wider angle and higher magnification. In a downsized lens having a wide angle and high magnification, refractive power of each lens tends to be increased, and hence correction of various aberrations becomes difficult. In view of this, there has been known a method of correcting, among the aberrations, distortion exerting geometric deformation on an image plane with use of image processing.

For example, in International Publication No. WO2008/139577, there is disclosed a diagram for illustrating images before and after correction of pincushion distortion. Further, in Japanese Patent Application Laid-Open No. 2009-43060, there is disclosed a diagram for illustrating images before and after correction of barrel distortion and pincushion distortion.

In general, the image quality is desired to be higher as approaching the center of the image. However, in International Publication No. WO2008/139577, the pincushion distortion is corrected by enlarging information on an image at a center side toward an outer side, and hence deterioration in image quality becomes conspicuous because the information is enlarged even at the center of the image. Particularly when a video is taken, high-speed image processing is required, and hence the number of pixels of an image pickup element is limited, or information obtained after calculation, for example, addition of information on a plurality of pixels is read out as unit-pixel information. Therefore, the amount of information on an image before the distortion correction is small, and thus the deterioration in image quality becomes more conspicuous.

SUMMARY OF THE INVENTION

The present invention provides, for example, a distortion correction method advantageous in reduction of image quality deterioration thereby.

According to one embodiment of the invention, there is provided a distortion correction method for an image pickup mode in which an image pickup is performed with an image pickup area, whose diagonal length is Ib, of an image pickup element which receives light from an optical system, an expression, $1.05 < Ia/Ib$, being satisfied in a case where a distortion correction is not performed, where Ia represents a diagonal length of an effective pixel area of the image pickup element, wherein distortion correction is performed for an image having a positive distortion so that image information positioned at an image height of Ic/2 is positioned at an image height of Ib/2, and so that a conditional expression, $1.0 < Ic/Ib$, is satisfied.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
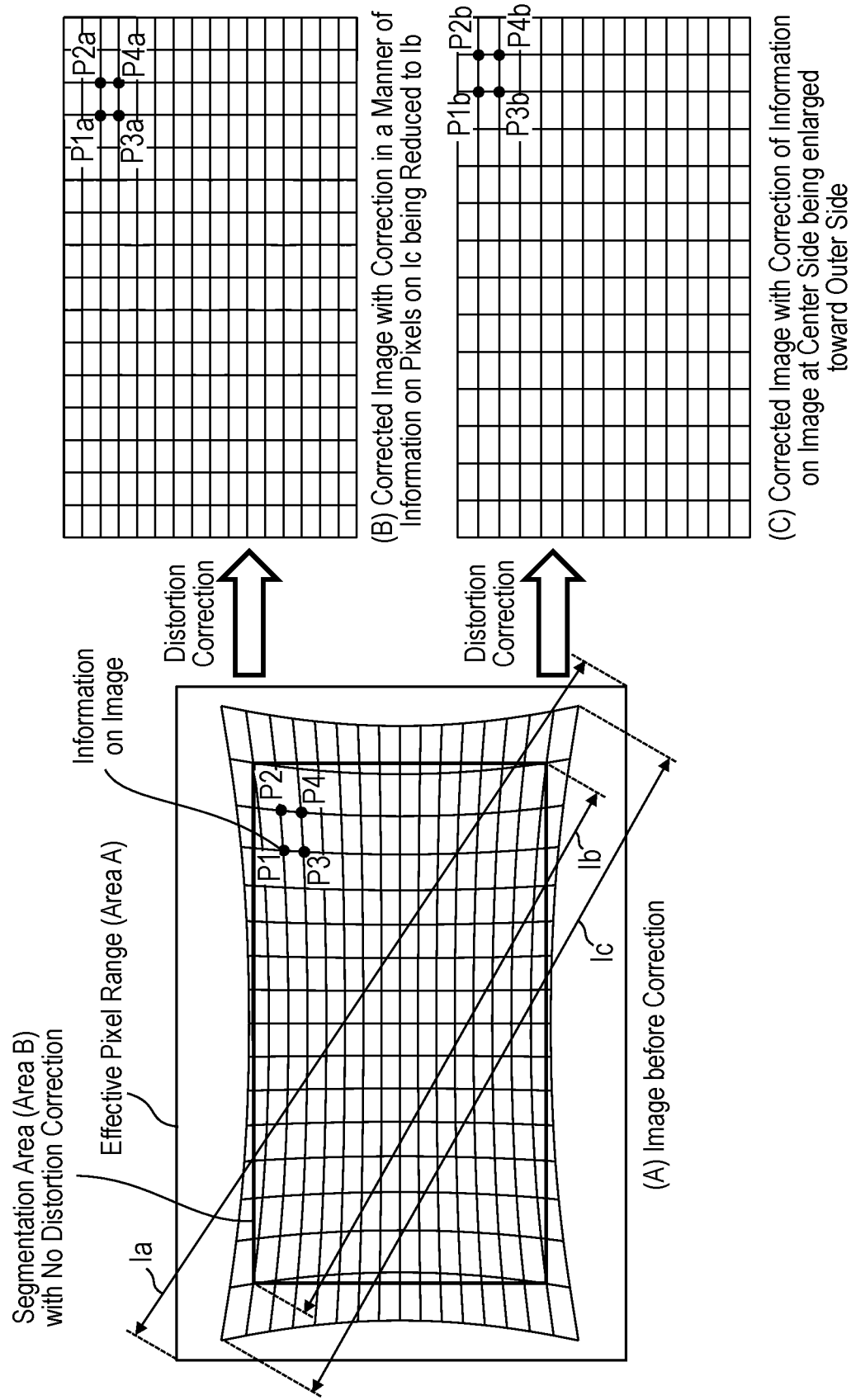
FIG. 1 is schematic diagram for illustrating change in image before and after distortion correction.

FIG. 1 is schematic diagrams for illustrating change in image before and after distortion correction. FIG. 1 (A) is an illustration of an image before distortion correction, and FIG. 1 (B) and FIG. 1 (C) are illustrations of images after distortion correction. In FIG. 1 (A), a diagonal length of an effective pixel area (area A) in which effective pixels of an image pickup element are arranged is represented by Ia, and a diagonal length of an area (area B) in which pixel information is cut out from the area A when no distortion correction is performed in a predetermined photographing mode M is represented by Ib. Further, a diagonal length of an area in which image information positioned in the area B after the correction is positioned before the correction when the distortion correction of the present invention is applied in the photographing mode M is represented by Ic.

FIG. 1 (B) is an illustration of a corrected image subjected to distortion correction by the method of the present invention, and FIG. 1 (C) is an illustration of a corrected image subjected to distortion correction by the related-art method (for example, International Publication No. WO2008/139577) (image in which distortion is corrected although the magnification differs from the original one with use of information picked up by the image pickup element in the area B).

In the distortion correction illustrated in FIG. 1 (C), pincushion distortion is corrected with use of only image information acquired by pixels in the area B. Image information around the image information acquired by the pixels in the area B when no distortion occurs is extended to the outside of the area B due to the pincushion distortion. Therefore, when the distortion is corrected with use of only the image information acquired by the pixels in the area B, there is obtained an image in which distortion correction is executed not on the image information having an original angle of view, but on an image having a narrow angle of view, in which an area protruding out of the area B is excluded.

Information P1 to information P4 on the image before distortion correction are pieces of information positioned at P1a to P4a or P1b to P4b after distortion correction. As compared to P1a to P4a of FIG. 1 (B) representing the information after the correction in the distortion correction method of the present invention, P1b to P4b of FIG. 1 (C) representing the information after the correction in the distortion correction method in which the information on an image at a center side is enlarged toward the outer side are positioned on the outer side on the image.

When the pincushion distortion occurs, in general, as the image is obtained at a position having a lower image height, the amount of distortion is smaller, and hence the required amount of distortion correction is smaller. In the distortion correction illustrated in FIG. 1 (C), an image having the maximum image height position after the correction (position at each of four corners of a rectangle of FIG. 1 (C)) corresponds to information on an image formed at an image height position that is higher than an original imaging position due to the pincushion distortion. As a result of correcting, with use of the image information at that position as a reference, the entire image that is deformed in shape due to distortion, the state of FIG. 1 (C) is obtained. Therefore, there is obtained an image in which, although the distortion as a shape is corrected, an original image without distortion is enlarged in an isotropic manner. Therefore, the image in the vicinity of the image center, which is expected to be small in movement amount when distortion is corrected, is also corrected by an amount that is larger than a correction amount originally required for correcting the distortion.

In contrast, in the distortion correction of the present invention illustrated in FIG. 1 (B), as compared to the case of the related-art (enlarging) distortion correction illustrated in FIG. 1 (C), the change in position of the information in the vicinity of the image center is smaller, and thus deterioration in image quality can be suppressed in the vicinity of the image center. In order to obtain the effect of the present invention, the distortion correction in the present invention satisfies the following conditional expressions:

$$1.05 < Ia/Ib \quad (1);$$

$$0\% < dIc \quad (2); \text{ and}$$

$$1.0 \leq Ic/Ib \quad (3),$$

where, when distortion correction is performed in the photographing mode M in which a photographing range is determined based on the diagonal length Ib when no distortion is corrected, the information positioned in the diagonal length Ib after the distortion correction is information positioned in the diagonal length Ic before the distortion correction, and dIc represents distortion before the distortion correction at the image height of Ic/2.

Conditional Expression (1) is an expression for defining a ratio of the diagonal length Ia of the effective pixels to the diagonal length Ib of the photographing range that is used when no distortion correction is performed in the photographing mode M. When the ratio Ia/Ib falls below the lower limit value of Conditional Expression (1), only little information usable for distortion correction is present on an outer side of a region to be cut out to have the diagonal length Ib, and it becomes difficult to perform correction while suppressing the image quality deterioration in the vicinity of the image center.

Conditional Expression (2) is an expression for defining distortion before distortion correction at the image height of Ic/2. In the present invention, the pincushion distortion is corrected with use of the information on the outer side of the range to be cut out to have the diagonal length Ib. A case in which the value falls below the lower limit of Conditional Expression (2) departs from the gist of the present invention.

Conditional Expression (3) is an expression for defining the change in diagonal length before and after the distortion correction of the information positioned in the diagonal length Ib after the distortion correction. When the ratio falls below the lower limit value of Conditional Expression (3), it becomes difficult to perform correction while suppressing the image quality deterioration in the vicinity of the image center. In general, distortion has a non-linear relationship with the image height, and hence there is no problem even when Ic=Ib is satisfied or distortion correction is performed at an image height lower than the image height Ic.

In a case of a zoom lens, it is only required that the zoom lens have a zoom position simultaneously satisfying Conditional Expressions (1) to (3).

The object of the present invention is achieved as described above, but the effect of the present invention can be more remarkably obtained when the photographing mode M is a video mode.

When a video is taken, higher-speed image processing is required as compared to the case in which a still image is taken. Therefore, in the video mode, even an image pickup apparatus including a high-resolution image pickup element that can take a still image at high resolution is required to limit the number of effective pixels of the image pickup element or add information of a plurality of pixels at the time of read-out to collectively process the plurality of pixels as a unit pixel in order to perform high-speed image processing. Therefore, in the video mode, the amount of information on an image before distortion correction is smaller than that in a still image mode, and the distortion is corrected by moving the image information based on the small image information. Therefore, deterioration in image quality becomes conspicuous. Enlargement of an image causes significant deterioration in image quality at the image center. Therefore, particularly when a video is taken, it is suitable to employ the distortion correction method of the present invention, which is capable of suppressing the deterioration in image quality in the vicinity of the image center, and in which the vicinity of the image center is less enlarged.

When the photographing mode M is the video mode, and there is a still image mode using a range of the image pickup element that is wider than that in the video mode, the method of correcting distortion by enlarging the information on the image at the center side toward the outer side, which is illustrated in FIG. 1 (C), may be used in the still image mode. The reason is as follows. The still image mode does not require high-speed image processing as compared to the video mode, and the resolution of the image pickup element included in the image pickup apparatus can be used as it is. Thus, the amount of information on the image before the distortion correction is large, and the deterioration in image quality due to the image processing is less conspicuous.

Further, the present invention is desired to be a distortion correction method of a case in which no extender is mounted. In general, the extender is arranged in a relay optical system of the lens or between the lens and a camera. Therefore, the absolute value of the distortion is reduced at a ratio close to the magnification. Therefore, when the extender is mounted, there is only small difference in image quality due to the difference in correction method for distortion correction, and hence it is difficult to obtain the effect of the present invention.

Further, it is desired to satisfy the following conditional expression in the present invention:

$$0.90 < Ie/Ia \quad (4).$$

where Ie represents a diameter of an effective image circle of the lens.

Conditional Expression (4) is an expression for defining the ratio of the diameter of the effective image circle of the lens to the diagonal length of the effective pixels of the image pickup element. When the ratio Ie/Ia falls below the lower limit value of Conditional Expression (4), the image pickup apparatus includes an unnecessarily-large image pickup element, and the image pickup apparatus is disadvantageously increased in size.

In the case of the zoom lens, it is only required that the zoom lens have the zoom position satisfying Conditional Expression (4).

Further, a lens apparatus to be connected to the image pickup apparatus to which the distortion correction method of the present invention is applied is desired to be a zoom lens in which a lens unit closest to an object side has a positive refractive power.

Distortion tends to occur when an off-axial ray passes through a position departed from the optical axis, and the lens unit closest to the object side significantly affects the distortion. In general, what causes the pincushion distortion in the lens unit closest to the object side is a lens having a positive refractive power, and the distortion correction method of the present invention is suitable for the zoom lens in which the lens unit closest to the object side has the positive refractive power.

Further, the lens apparatus to be connected to the image pickup apparatus to which the distortion correction method of the present invention is applied is desired to be a zoom lens satisfying the following conditions:

$$36.0° < \arctan\{(Ia/2)/fw\} \quad (5); \text{ and}$$

$$4.0 < z \quad (6),$$

where fw represents a focal length at the wide angle end, and z represents a zoom ratio.

In optical design of the zoom lens, it is possible to design the zoom lens so that the distortion in the entire zoom range exhibits only one of the barrel distortion characteristic and the pincushion distortion characteristic. In general, the zoom lens tends to have larger barrel distortion at the wide angle end and larger pincushion distortion on the telephoto side. When the zoom lens is designed so that the pincushion distortion is equal to or smaller than a predetermined aberration amount in the zoom range, the barrel distortion on the wide angle side is increased to exceed an allowable range, and in some cases, the pincushion distortion cannot be suppressed to be equal to or smaller than a desired amount with the optical design of the zoom lens. It can be said that the present invention having an object of suppressing the image quality deterioration during pincushion distortion correction is suitable for such a case, that is, for a zoom lens having a large variation in distortion during zooming and having no optical design margin for shifting the distortion characteristic to the barrel side or the pincushion side any more.

Conditional Expression (5) is an expression for defining an angle of view at the wide angle end of the zoom lens to be connected to the image pickup apparatus to which the distortion correction of the present invention is applied. In the zoom lens having a wide angle of view to an extent that the zoom lens satisfies Conditional Expression (5), in many cases, the barrel distortion caused on the wide angle end side is large, and the pincushion distortion cannot be sufficiently suppressed only by shifting the optical characteristic to the barrel side with the optical design. Therefore, the present invention is more effectively applicable. Meanwhile, in a zoom lens having a small angle of view at the wide angle end to an extent that the zoom lens does not satisfy Conditional Expression (5), barrel distortion is less caused in the zoom range, and the variation in distortion during zooming is small. Therefore, even when the pincushion distortion is large, the pincushion distortion can be decreased by shifting the optical characteristic to the barrel side with the optical design, and the object can be achieved even without using the present invention.

Further, Conditional Expression (6) identifies the zoom ratio of the zoom lens for which the distortion correction of the present invention is more effectively applicable. When the zoom ratio is large to an extent that the zoom lens satisfies Conditional Expression (6), a wide angle can be obtained to the extent that barrel distortion is caused on the wide angle end side, and the telephoto side is obtained to the extent that large pincushion distortion is caused even on the telephoto side. Therefore, the distortion correction of the present invention is suitably applicable. Meanwhile, when the zoom ratio is small to an extent that the zoom lens does not satisfy Conditional Expression (6), barrel distortion and pincushion distortion are not significantly caused to an extent that the balance between barrel distortion and pincushion distortion is required to be considered, and the pincushion distortion can be suppressed with the optical design. Therefore, the object of suppressing the deterioration in image quality at the image center can be achieved even without using the present invention.

Further, the present invention is desired to employ an interchangeable lens system. With the interchangeable lens system, the image pickup element can be efficiently used, for example, effective pixels may be maximally used for the lens that does not require distortion correction.

It is more preferred to specify the numerical ranges of the conditional expressions (1) to (6) as follows:

$$1.1 < Ia/Ib < 3.0 \quad (1a);$$

$$1\% < dIc < 15\% \quad (2a);$$

$$1.0 < Ic/Ib < 1.18 \quad (3a);$$

$$0.95 < Ie/Ia < 2.0 \quad (4a);$$

$$38.0° < \arctan\{(Ia/2)/fw\} < 60.0° \quad (5a); \text{ and}$$

$$4.0 < z < 200.0 \quad (6a).$$

Further, it is even more desired to specify the numerical range of the conditional expressions (1a) to (6a) as follows:

$$1.4 < Ia/Ib < 2.0 \quad (1b);$$

$$2\% < dIc < 10\% \quad (2b);$$

$$1.01 < Ic/Ib < 1.13 \quad (3b);$$

$$1.00 < Ie/Ia < 1.3 \quad (4b);$$

$$40.0° < \arctan\{(Ia/2)/fw\} < 55.0° \quad (5b); \text{ and}$$

$$7.0 < z < 125.0 \quad (6a).$$

Now, exemplary embodiments of the present invention are described in detail with reference to the accompanying drawings.

Figure 2:
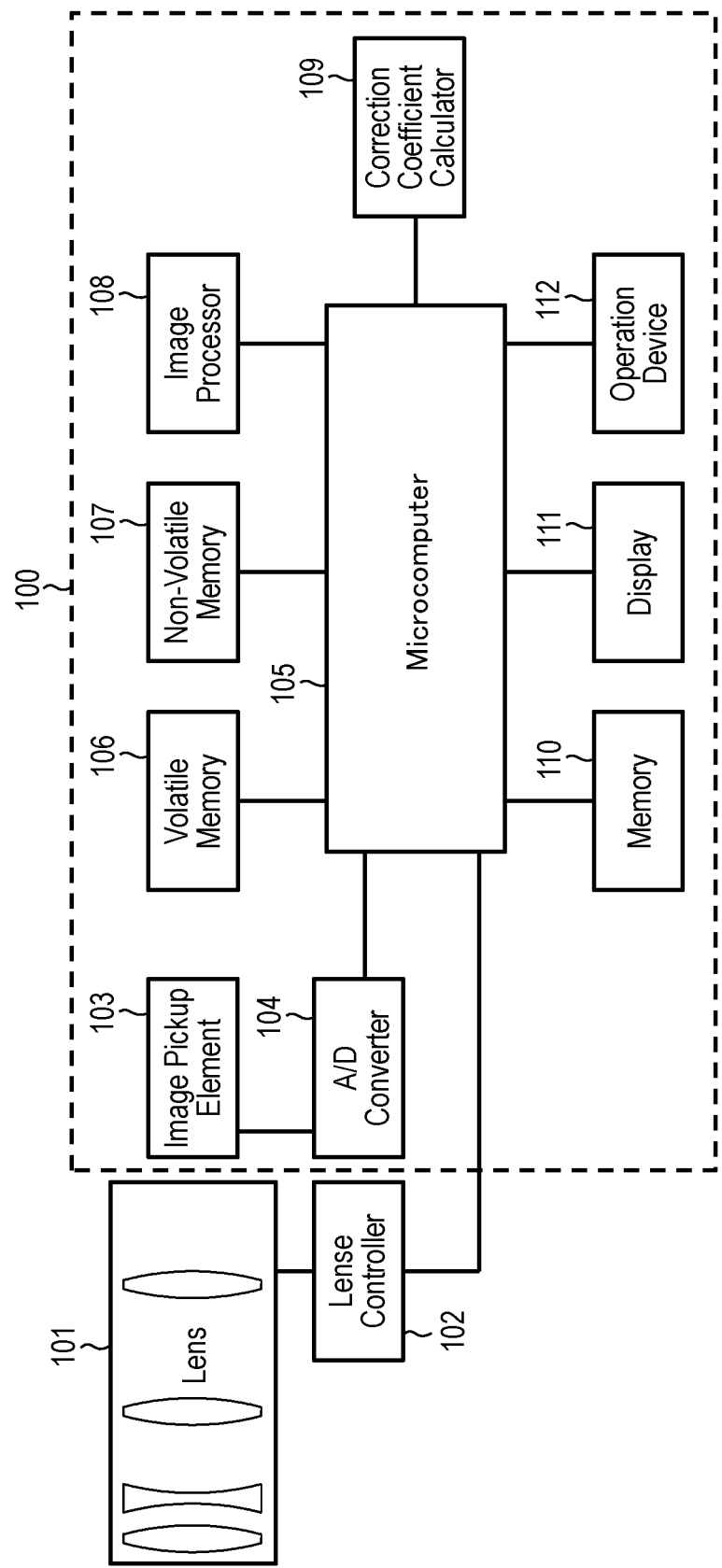
FIG. 2 is a block diagram for illustrating a configuration of an image pickup apparatus.

FIG. 2 is a block diagram for illustrating a configuration of the image pickup apparatus including a distortion correction apparatus to which the present invention is applied. In FIG. 2, a lens 101 includes a stop (not shown) and a lens drive mechanism (not shown). In this embodiment, the lens 101 is exemplified as an interchangeable lens configured to be removably mounted to a camera 100. Light from an object is obtained through the lens 101. The lens 101 may be integrally formed with the camera 100. A lens controller 102 is a block for controlling and managing the lens, for example, controlling zooming of the lens 101, controlling the stop, and acquiring a zoom direction and a zoom position of the lens. The lens controller 102 may be provided on the camera side or the lens side.

An image pickup element 103 receives an optical image formed by the lens 101, and stores information on the obtained light as charges. An AD converter 104 converts information on the charges obtained by the image pickup element 103 into digital data. A microcomputer 105 performs operation control of the camera 100, sequence control of image processing, and control of distortion correction processing. Further, the microcomputer 105 can receive (communicate) information (signal) related to the lens, for example, the zoom direction and the zoom position of the lens, from the lens controller 102. A volatile memory 106 is a memory to be used by the microcomputer 105 for control or to be used by an image processor 108 or a correction coefficient calculator 109 for processing. A non-volatile memory 107 is a block for storing, for example, setting information on the camera 100, correction coefficient parameters for the distortion correction, information on the image pickup element, and parameters for image processing. The non-volatile memory 107 may be provided on the camera side, on the lens side, or on both of the camera side and the lens side.

The image processor 108 (distortion correction apparatus) is a block for performing development processing on information obtained by the microcomputer 105 from the image pickup element 103 via the AD converter 104 or distortion correction processing in which the distortion correction method of the present invention is executed. The correction coefficient calculator 109 is a block for calculating, from the correction coefficient parameters stored in the non-volatile memory 107, for example, a required distortion correction coefficient or a correction coefficient for lens optical correction, for example, chromatic aberration correction or peripheral light amount reduction correction. The distortion correction coefficient calculated in the correction coefficient calculator 109 is stored in the volatile memory 106. The volatile memory 106 can store one or more distortion correction coefficients. The correction coefficient calculator 109 is a block that is different from the microcomputer 105, but the microcomputer 105 may serve as the correction coefficient calculator 109. A memory 110 is a block for storing image data obtained from the image processor 108. The memory 110 may be built in the camera 100 or may be removable. A display 111 is a block for displaying photographing setting or displaying a taken image. An operation device 112 is formed of buttons and switches, and is a block for receiving input from a user. An operation from the user is received by the operation device 112, and the operation is implemented by the microcomputer 105 controlling the respective blocks based on the processing content.

Further, in this embodiment, the microcomputer 105, the volatile memory 106, the non-volatile memory 107, the image processor 108, and the correction coefficient calculator 109 function as an image processing apparatus.

Now, embodiments of the present invention are described.

First Embodiment

Figure 3:
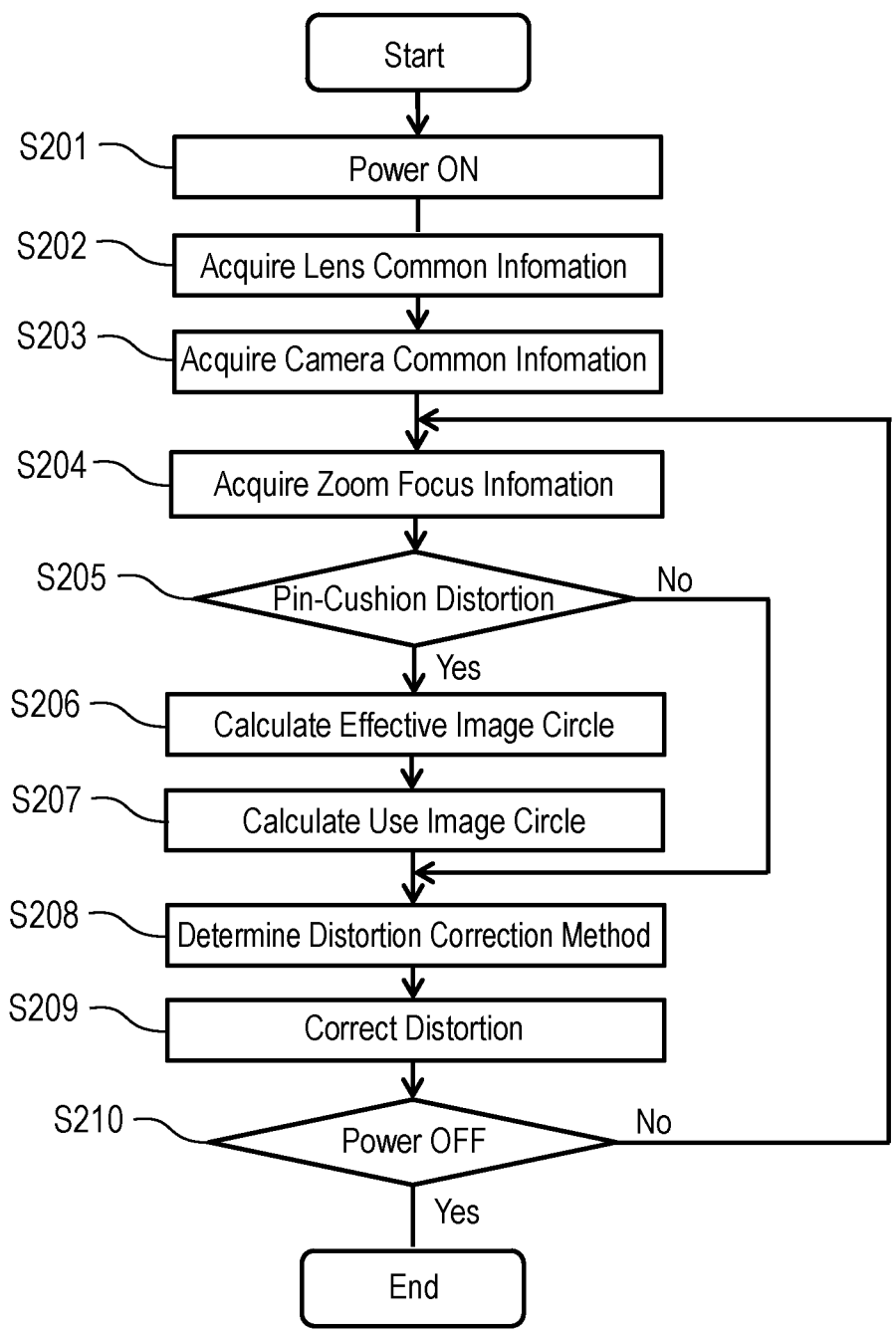
FIG. 3 is a flow chart for illustrating control in a first embodiment of the present invention.

FIG. 3 is a flow chart for illustrating control in a first embodiment of the present invention. Referring to FIG. 3, the distortion correction method of the present invention is described.

In Step S201, power of the camera 100 is turned on.

In Step S202, the lens type, the information on distortion, and the like are read out from the non-volatile memory 107. The first embodiment employs a system in which all pieces of information on distortion are acquired, but the information on distortion may be acquired based on the lens position after the lens position is acquired in Step S204 to be described later.

In Step S203, the diagonal length Ia of the effective pixels of the image pickup element and the like are read out from the non-volatile memory 107.

In Step S204, information on the zoom or focus position of the lens, the zoom direction, and the like is acquired from the lens controller 102.

In Step S205, the microcomputer 105 determines whether or not the distortion has a pincushion shape based on the information of Step S202 to Step S204. The distortion may have a barrel shape at a low image height and a pincushion shape at a high image height, or may have a pincushion shape at a low image height and a barrel shape at a high image height, and hence it is determined that the distortion has a pincushion shape when the pincushion shape is obtained at a part of the image heights. Processing of Step S207 to be described later may be performed previously so as to determine whether the distortion has a pincushion shape or a barrel shape at a specific image height. When the distortion is determined to be the pincushion distortion, the processing proceeds to Step S206, and when the distortion is determined to be the barrel distortion, the processing proceeds to Step S208.

In Step S206, the microcomputer 105 calculates the size of the effective image circle based on the information of Step S202 to Step S204. In this case, the effective image circle is a minimum image circle that can obtain an amount of light suitable for photographing, which takes into consideration, for example, the amount of light of the lens, whether or not the extender is mounted, and the amount of image stabilization achieved by at least part of the lens. In this case, the diameter of the effective image circle is represented by Ie. It is assumed that, when the amount of light at an image height position with the diameter Ie is equal to or larger than 30% of the amount of light at the image center, an amount of light suitable for photographing is obtained. When the amount of light is rotationally asymmetric with respect to the optical axis during image stabilization, in a cross section with a small amount of light, Ie corresponds to twice of an image height at which the amount of light is equal to or larger than 30% of the amount of light at the image center. In the first embodiment, the required amount of light is 30% or more, but may be 20% or more because alleviation is possible through peripheral light amount correction.

In Step S207, a range of a use image circle is calculated based on the information of Step S203. In this case, the use image circle is a diagonal length of a range of pixels for receiving information, which is stored in the memory 110. When the image stabilization is performed by moving the image pickup element of the camera, or when the image stabilization is performed by changing a cut-out range of the image pickup element, the range is determined by adding the movement amount and pixels required for the image stabilization. Further, the size of the use image circle matches the diagonal length Ib when the distortion is not corrected, and matches the diagonal length Ic before correction when the distortion is corrected.

In Step S208, the distortion correction method is determined. More specifically, when the distortion is determined to be the pincushion distortion in Step S205, the following processing is performed. When the distortion dIc before distortion correction at the image height of Ic/2 is pincushion distortion, the diagonal length Ic before the distortion correction is larger than the diagonal length Ib after the distortion correction. When the diagonal length Ia of the effective pixels is larger than the diagonal length Ib in the photographing mode M, the aberration can be corrected with use of the information on the outer side of the range cut out to have the diagonal length Ib. Therefore, when it is determined in Step S206 and Step S207 that the amount of light in the use image circle is sufficient, in Step S209, the image information at each image height is corrected based on the amount of distortion at each image height so that the distortion is corrected in a manner that the information positioned in the diagonal length Ic before the distortion correction has the diagonal length Ib. When the distortion correction is performed as described above, enlargement of the image in the vicinity of the image center due to the correction can be avoided, and the image quality deterioration at the image center is suppressed.

When the power is still on in Step S210, the processing returns to Step S204 when the zoom or focus position changes, and the processing of Step S204 to Step S209 is performed. When there is no change in zoom or focus in Step S204, the same processing as that before returning to Step S204 may be performed in Step S209. When the power is turned off, the power of the camera 100 is turned off and the processing is ended.

Figure 4:
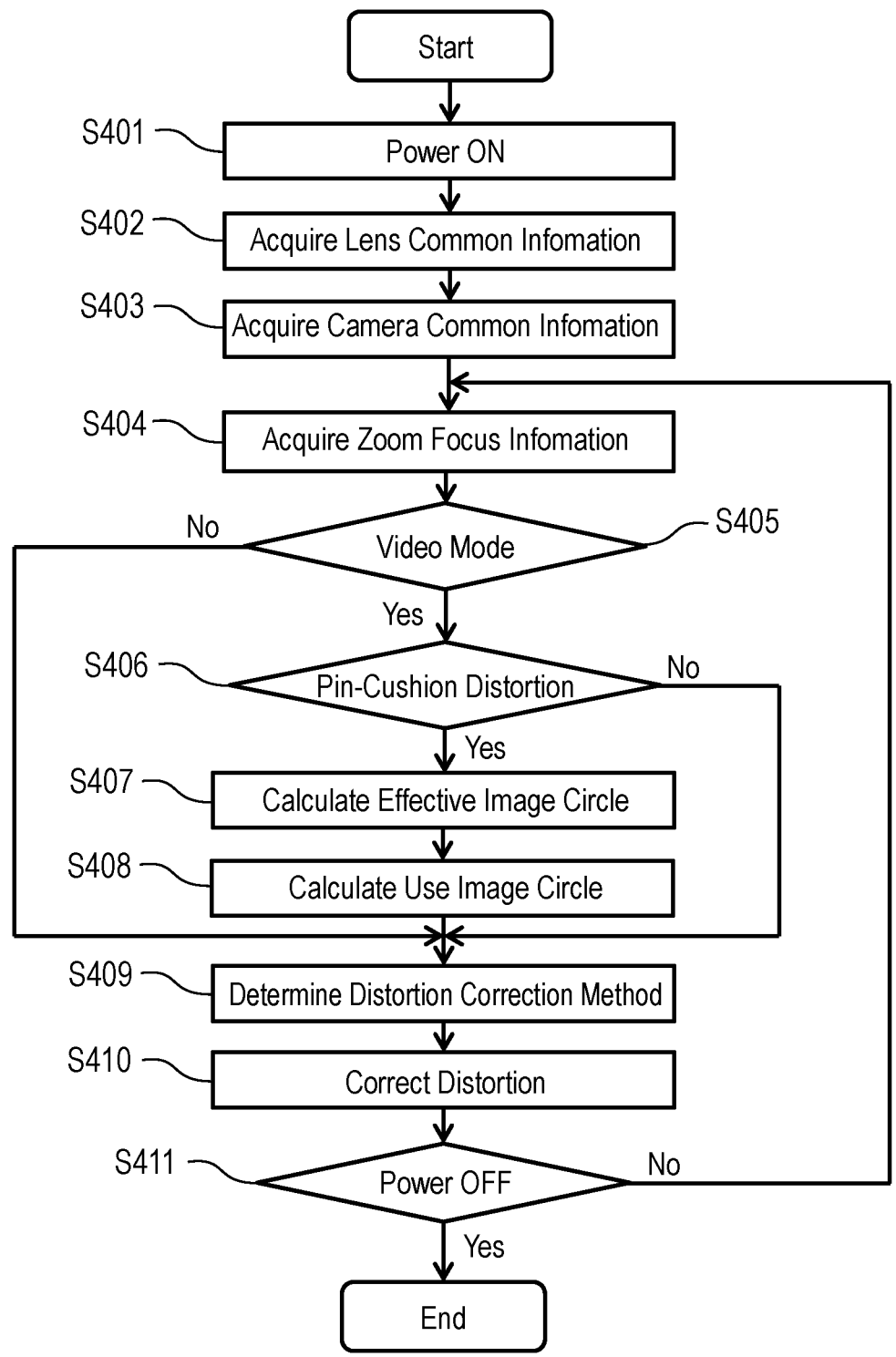
FIG. 4 is a flow chart for illustrating control in a second embodiment of the present invention.

FIG. 4 is a flow chart for illustrating control in a second embodiment of the present invention. The processing other than Step S405 in which determination on the video mode is performed is similar to that of the first embodiment. When it is determined that the mode is not the video mode in Step S405, a method of performing distortion correction by enlarging the information on the image at the center side toward the outer side, which is illustrated in FIG. 1 (C), is employed. Thus, there is obtained a flow that does not require checking of the relationship between the effective image circle and the use image circle.

Figure 5:
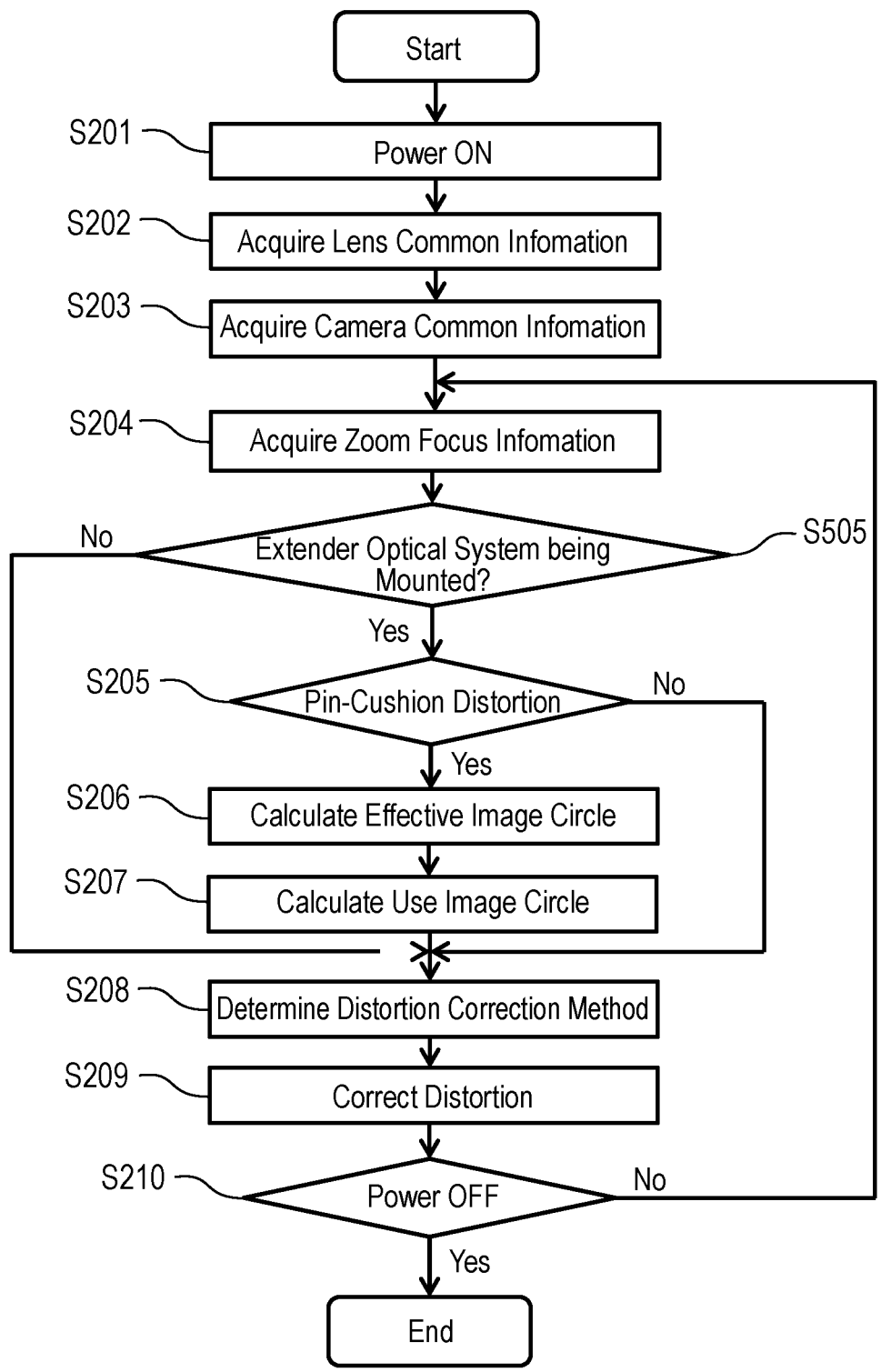
FIG. 5 is a flow chart for illustrating control in a third embodiment of the present invention.

FIG. 5 is a flow chart for illustrating control in a third embodiment of the present invention. The processing other than Step S504 in which determination on whether or not the extender is mounted is similar to that of the first embodiment. When it is determined that the extender is mounted in Step S505, a method of performing distortion correction by enlarging the information on the image at the center side toward the outer side, which is illustrated in FIG. 1 (C), is employed. Thus, there is obtained a flow that does not require checking of the relationship between the effective image circle and the use image circle. The state in which the extender is mounted refers to a state in which at least one of a built-in extender or an external extender is usable.

Now, Numerical Example to which the above-mentioned first, second, and third embodiments are applied is described in detail with reference to the attached drawings.

Figure 6:
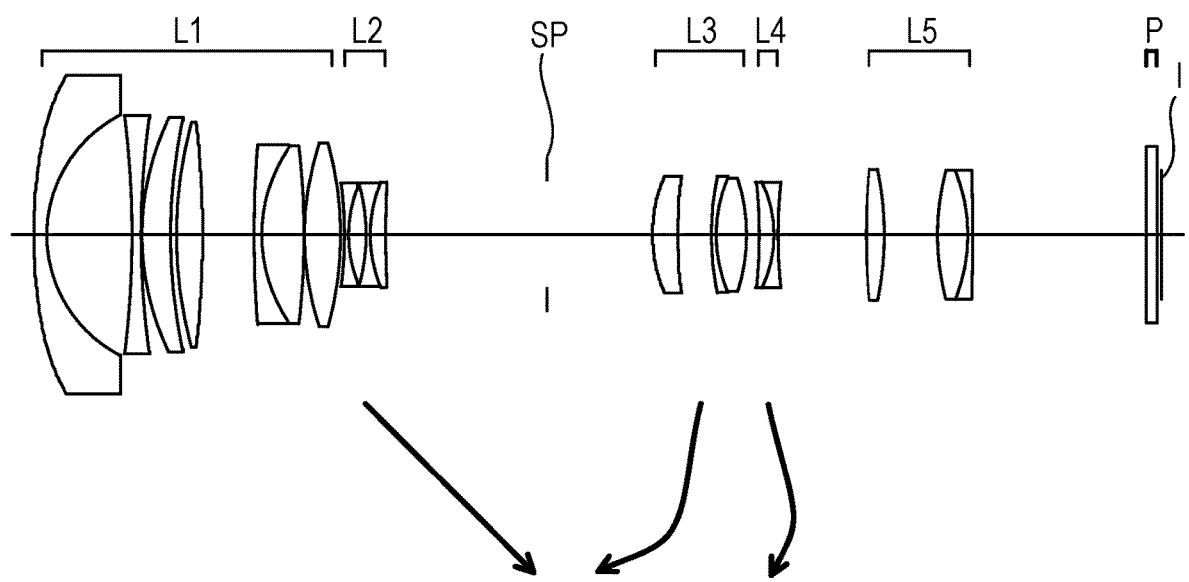
FIG. 6 is a lens cross-sectional view for illustrating an optical system in Numerical Example L of the present invention.
Figure 7:
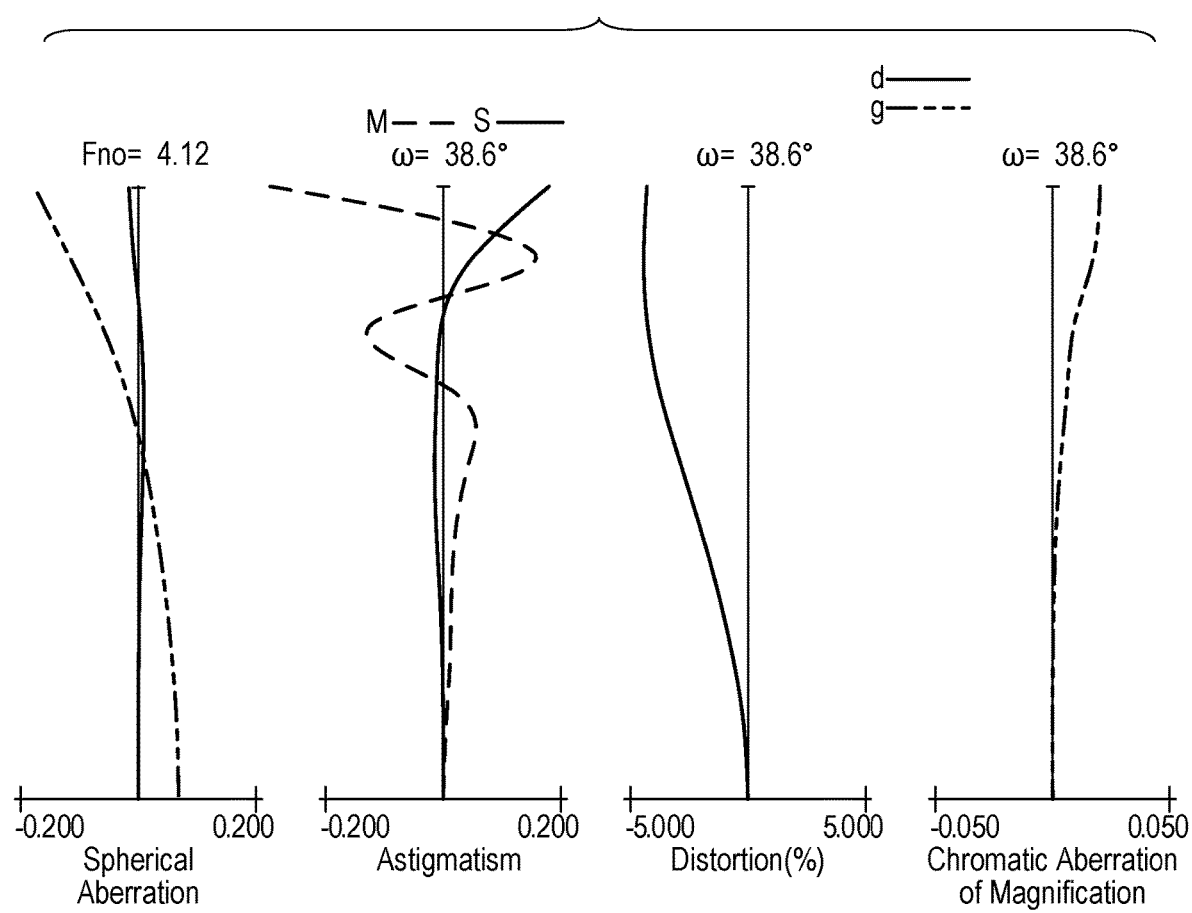
FIG. 7 is an aberration diagram in Numerical Example 1 at a wide angle end.
Figure 8:
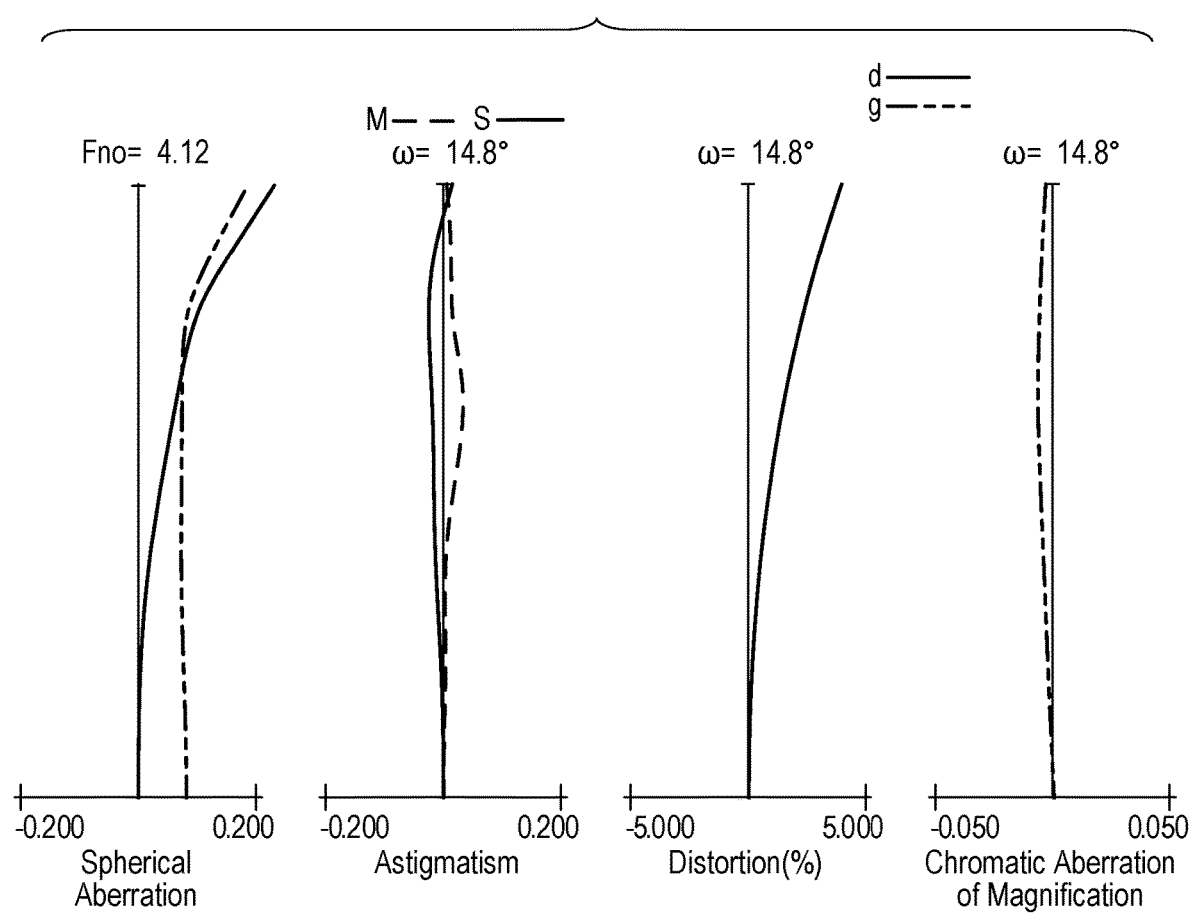
FIG. 8 is an aberration diagram in Numerical Example 1 at an intermediate focal length.
Figure 9:
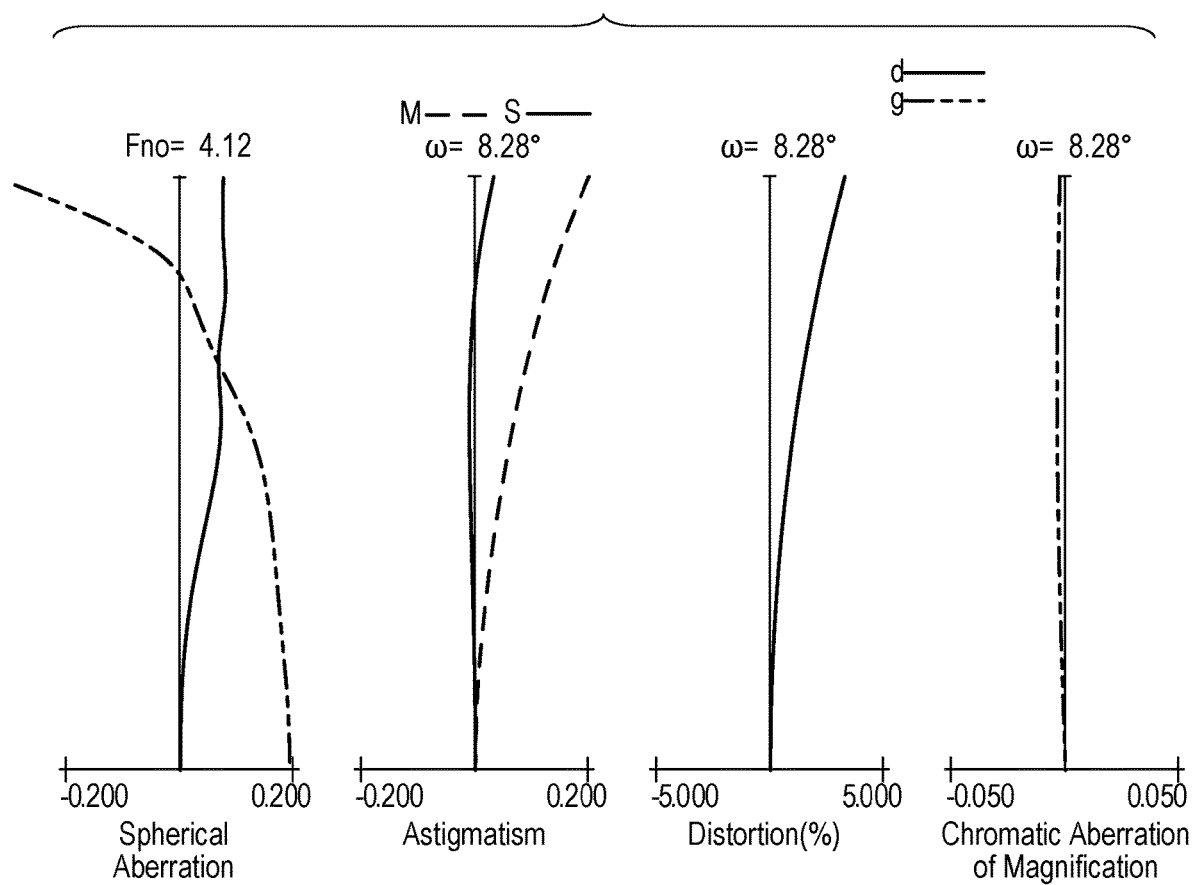
FIG. 9 is an aberration diagram in Numerical Example 1 at a telephoto end.
Figure 10:
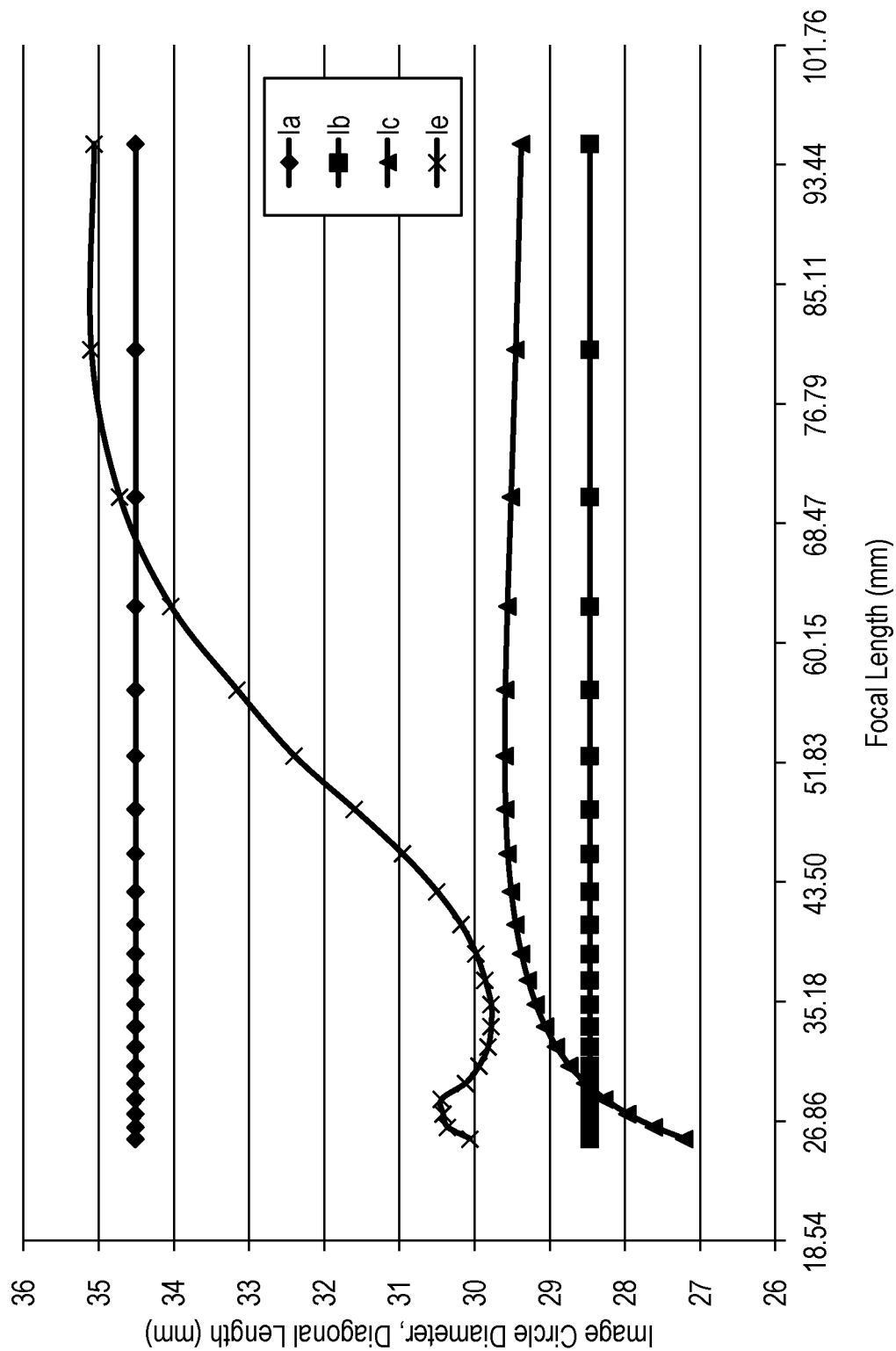
FIG. 10 is a graph for showing each image circle diameter and diagonal length in Numerical Example 1.

FIG. 6 is a cross-sectional view of a zoom lens of Numerical Example to be described later, and FIG. 7 to FIG. 9 are aberration diagrams of Numerical Example. In FIG. 7 to FIG. 9, FIG. 7 is an aberration diagram at a wide angle end (focal length of 18.54 mm), FIG. 8 is an aberration diagram at an intermediate focal length (focal length of 56.09 mm), and FIG. 9 is an aberration diagram at a telephoto end (focal length of 101.76 mm). In the aberration diagrams, a d-line and a g-line are represented by d and g, respectively, a meridional image plane and a sagittal image plane are represented by M and S, respectively, and the lateral chromatic aberration is expressed with the g-line.

FIG. 6 is a lens cross-sectional view for illustrating the first lens unit L1, the second lens unit L2, the third lens unit L3, the fourth lens unit L4, and the fifth lens unit L5, an aperture stop SP, a glass block P, for example, a low-pass filter or a face plate of a CCD, and an image plane I.

In Numerical Example, each lens unit is configured to move as indicated by the arrow in FIG. 6 during magnification from the wide angle end to the telephoto end. Focusing is performed by moving a fourth lens from the object side in the first lens unit. Further, the back focus can be adjusted by moving the last lens unit or a part of the last lens unit in the optical axis direction.

Numerical Example of the present invention is shown below.

In Numerical Example, "ri" represents a radius of curvature of an i-th surface from the object side, "di" represents an interval between the i-th surface and an (i+1)-th surface (lens thickness or air interval), and ndi and vdi represent a refractive index and an Abbe number of the material of the lens between the i-th surface and the (i+1)-th surface, respectively.

When a displacement amount from the surface vertex in the optical axis direction is represented by X, a height from the optical axis in a direction vertical to the optical axis is represented by "h", a light traveling direction is positive, a paraxial curvature radius is represented by R, a conic constant is represented by "k", and respective aspherical surface coefficients are represented by A4, A6, A8, A10, A12, A14, and A16, the shape of the aspherical surface is represented by the following expression.

$$X = \frac{(1/R)h^2}{1 + \sqrt{1 - (1+k)(h/R)^2}} + A4h^4 + A6h^6 + A8h^8 + A10h^{10} + A12h^{12} + A14h^{14} + A16h^{16}$$

When a movement ratio from the wide angle end to the telephoto end of the second lens unit is represented by Zp, a case in which movement is performed to the image side is positive, and respective movement coefficients are represented by "a", "b", "c", "d", "e", and "f", a third lens unit movement amount m3 is represented by the following expression.

$$m3 = aZp + bZp^2 + cZ^3 + dZp^4 + eZp^5 + fZp^6$$

Further, for example, the notation "e-Z" means "×10$^{-Z}$". The aspherical surface is indicated by attaching the asterisk "*" to the surface number.

A half angle of view is a value determined by ray tracing. A back focus is represented by BF.

The relationship between each of the above-mentioned conditional expressions and various numerical values of Numerical Example when the zoom lens exemplified in Numerical Example is mounted to the camera 100 serving as the image pickup apparatus illustrated in FIG. 1 to apply the distortion correction of the present invention is shown in Table 1. There is exemplified a case in which, as the image pickup element 103, an image pickup element having a size of 30.2 mm×16.7 mm (diagonal length: 34.51 mm) is used, but the present invention is not limited thereto.

As understood from Conditional Expressions and various numerical values in Numerical Example shown in Table 1, the zoom lens apparatus of Numerical Example satisfies Conditional Expression (1) in a range from the wide angle end to the telephoto end (focal length: 18.54 mm to 101.76 mm), and satisfy Conditional Expressions (2) and (3) in a range of the focal length from 23.19 mm to 101.76 mm. Further, the zoom lens apparatus of Numerical Example satisfies Conditional Expression (4) in a range of the focal length from 46.1 mm to 101.76 mm, and satisfies Conditional Expressions (5) and (6) at the wide angle end. Thus, the conditions of the present invention are satisfied.

Figure 11:
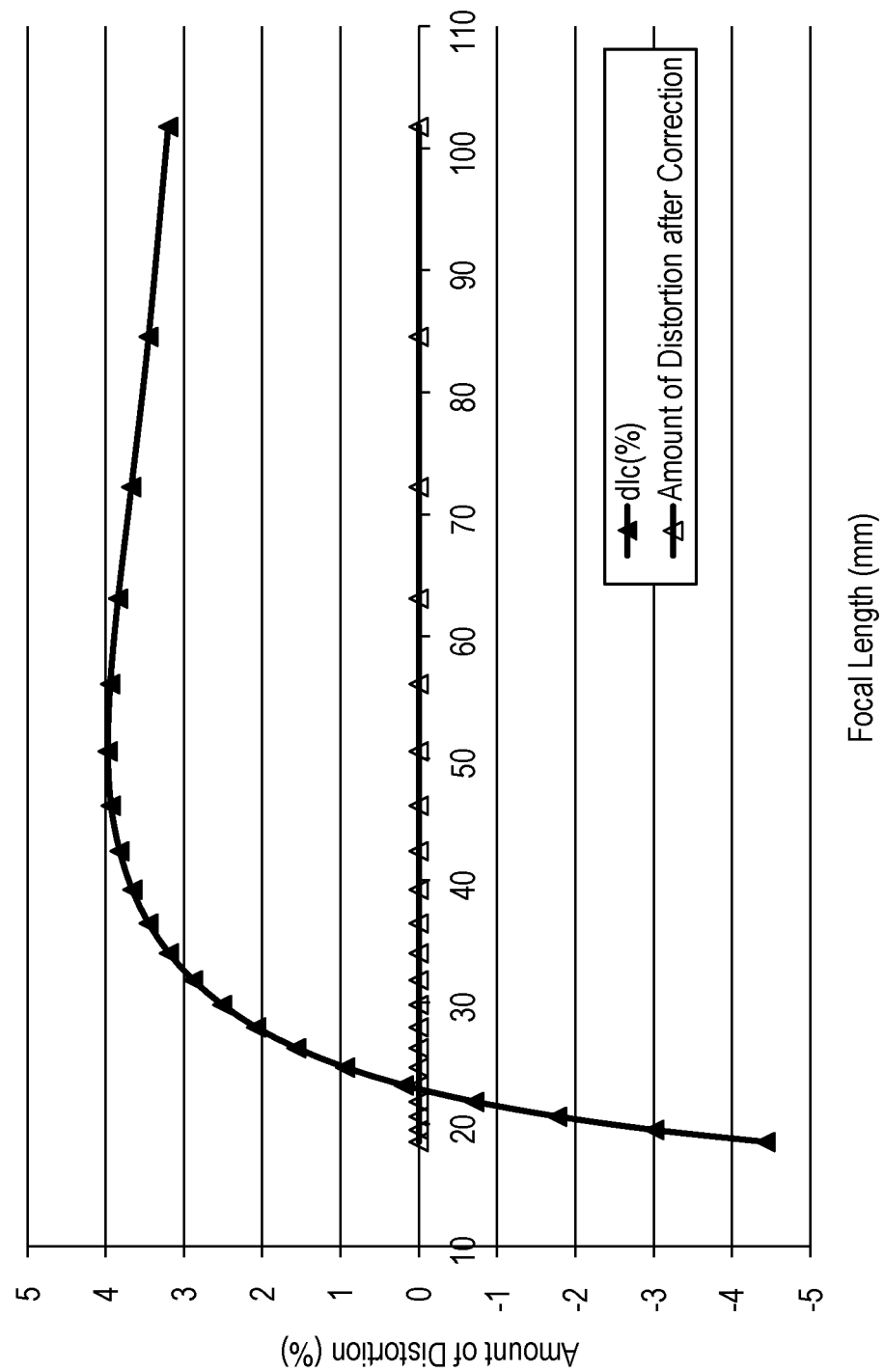
FIG. 11 is a graph for showing an amount of distortion in Numerical Example 1.

Further, it is understood that, as shown in FIG. 11, after the image is subjected to distortion correction, the distortion is corrected throughout the entire focal length.

As described above, according to each embodiment, it is possible to provide the distortion correction method, the image pickup apparatus, and the distortion correction apparatus, which are capable of suppressing image quality deterioration.

Although the exemplary embodiments of the present invention have been described so far, the present invention is by no means limited to those embodiments, and hence various changes and modifications can be made within the scope of the subject matter of the present invention.

Numerical Example 1

Surface data

| Surface number | r | d | nd | vd | Effective diameter |
|---|---|---|---|---|---|
| 1* | 142.107 | 2.97 | 1.77250 | 49.6 | 72.80 |
| 2 | 30.833 | 19.23 | | | 54.80 |
| 3 | −214.418 | 2.25 | 1.63854 | 55.4 | 54.40 |
| 4 | 193.318 | 0.17 | | | 53.60 |
| 5 | 61.723 | 6.53 | 1.84666 | 23.8 | 53.50 |
| 6 | 125.558 | 1.26 | | | 52.00 |
| 7 | 97.080 | 5.98 | 1.58313 | 59.4 | 51.20 |
| 8* | −189.724 | 11.66 | | | 50.70 |
| 9 | 245.465 | 1.71 | 1.80000 | 29.8 | 40.80 |
| 10 | 35.310 | 9.71 | 1.49700 | 81.5 | 40.00 |
| 11 | −162.533 | 0.17 | | | 40.60 |
| 12 | 65.776 | 8.03 | 1.63854 | 55.4 | 42.10 |
| 13 | −77.715 | (Variable) | | | 42.00 |
| 14 | −91.062 | 0.99 | 1.83481 | 42.7 | 23.50 |
| 15 | 28.912 | 3.84 | | | 21.50 |
| 16 | −42.067 | 1.19 | 1.49700 | 81.5 | 21.60 |
| 17 | 30.945 | 3.61 | 1.85478 | 24.8 | 23.70 |
| 18 | 474.495 | (Variable) | | | 24.00 |
| 19 (Stop) | ∞ | (Variable) | | | 24.70 |
| 20* | 34.929 | 5.84 | 1.58313 | 59.4 | 26.80 |
| 21* | 188.561 | 7.42 | | | 26.30 |
| 22 | 62.689 | 1.29 | 2.00069 | 25.5 | 26.50 |
| 23 | 32.976 | 6.65 | 1.48749 | 70.2 | 26.00 |
| 24 | −41.767 | (Variable) | | | 26.00 |
| 25 | −110.109 | 3.39 | 1.95906 | 17.5 | 23.90 |
| 26 | −27.760 | 1.09 | 1.85478 | 24.8 | 24.00 |
| 27 | 110.961 | (Variable) | | | 24.20 |
| 28 | 155.225 | 3.89 | 1.48749 | 70.2 | 29.80 |
| 29 | −71.770 | 12.40 | | | 30.00 |
| 30 | 56.836 | 6.63 | 1.49700 | 81.5 | 29.50 |
| 31 | −39.229 | 1.25 | 1.91082 | 35.3 | 29.20 |
| 32 | −795.036 | (Variable) | | | 29.30 |
| 33 | ∞ | 2.39 | 1.51633 | 64.1 | 40.00 |
| 34 | ∞ | 1.00 | | | 40.00 |
| Image plane | ∞ | | | | |

Aspherical surface data

First surface

K = 9.60256e+000   A4 = 9.02841e−007   A6 = 6.57246e−010
A8 = −2.34864e−012   A10 = 3.36885e−015   A12 = −2.34122e−018
A14 = 6.42583e−022   A16 = −2.10451e−026

Eighth surface

K = −7.19297e+001   A4 = −4.48892e−007   A6 = 1.30222e−009
A8 = −2.14328e−012   A10 = 1.12728e−015   A12 = 6.02779e−019
A14 = −6.86578e−022   A16 = −3.24205e−025

Twentieth surface

K = 3.22915e+000   A4 = −7.43684e−006   A6 = −1.64141e−008
A8 = −4.87770e−011   A10 = −4.23427e−014   A12 = −2.24623e−016
A14 = −3.93621e−018   A16 = 6.48189e−021

Twenty-first surface

K = 1.62572e+002   A4 = 6.39763e−006   A6 = 5.31874e−010
A8 = −4.54040e−011   A10 = 1.44685e−0 13   A12 = −5.92999e−016
A14 = 5.71689e−019   A16 = −1.89487e−020

Various data
Zoom ratio 5.49

| Focal length | 18.54 | 56.09 | 101.76 |
|---|---|---|---|
| F-number | 4.12 | 4.12 | 4.12 |
| Half angle of view | 38.60 | 14.78 | 8.28 |
| Image height | 14.80 | 14.80 | 14.80 |
| Total lens length | 256.18 | 256.18 | 256.18 |
| BF | 42.19 | 42.19 | 42.19 |
| d13 | 1.00 | 28.34 | 35.17 |
| d18 | 36.53 | 9.19 | 2.36 |
| d19 | 24.21 | 16.90 | 2.97 |
| d24 | 2.79 | 15.03 | 25.59 |
| d27 | 20.31 | 15.37 | 18.74 |
| d32 | 39.61 | 39.61 | 39.61 |

Zoom lens unit data

| Unit | First surface | Focal length |
|---|---|---|
| 1 | 1 | 48.32 |
| 2 | 14 | −24.83 |
| 3 | 19 | ∞ |
| 4 | 20 | 43.10 |
| 5 | 25 | −78.50 |
| 6 | 28 | 99.75 |
| 7 | 33 | ∞ |

Third lens unit movement amount data a = 7.337074E−01
b = −3.780674E+01
c = 8.863979E+01
d = −7.350326E+01
e = 1.287897E+01
f = −1.217630E+01

TABLE 1

Relationships between each conditional expression and various numerical values in Numerical Example

| Conditional expressions | Focal length | | | | | | | | | | |
|---|---|---|---|---|---|---|---|---|---|---|---|
| | Wide angle end 18.54 | 19.52 | 20.63 | 21.85 | 23.19 | 24.65 | 26.23 | 27.94 | 29.79 | 31.81 | 34.01 |
| (1) Ia/Ib | 1.212 | 1.212 | 1.212 | 1.212 | 1.212 | 1.212 | 1.212 | 1.212 | 1.212 | 1.212 | 1.212 |
| (2) dIc (%) | −4.4 | −3.0 | −1.8 | −0.7 | 0.2 | 0.9 | 1.6 | 2.1 | 2.5 | 2.9 | 3.2 |
| (3) Ic/Ib | 0.96 | 0.97 | 0.98 | 0.99 | 1.00 | 1.01 | 1.02 | 1.02 | 1.03 | 1.03 | 1.03 |
| (4) Ie/Ia | 0.871 | 0.880 | 0.881 | 0.882 | 0.873 | 0.868 | 0.864 | 0.863 | 0.863 | 0.865 | 0.869 |
| (5) arctan{(Ia/2)/fw} | 42.95 | | | | | | | | | | |
| (6) z | 5.49 | | | | | | | | | | |
| Ia | 34.51 | 34.51 | 34.51 | 34.51 | 34.51 | 34.51 | 34.51 | 34.51 | 34.51 | 34.51 | 34.51 |
| Ib | 28.47 | 28.47 | 28.47 | 28.47 | 28.47 | 28.47 | 28.47 | 28.47 | 28.47 | 28.47 | 28.47 |
| Ic | 27.21 | 27.61 | 27.97 | 28.27 | 28.53 | 28.74 | 28.91 | 29.06 | 29.19 | 29.29 | 29.38 |
| Ie | 30.06 | 30.36 | 30.42 | 30.44 | 30.12 | 29.94 | 29.82 | 29.78 | 29.78 | 29.86 | 29.98 |
| Amount of distortion after correction (%) | 0.0 | 0.0 | 0.0 | 0.0 | 0.0 | 0.0 | 0.0 | 0.0 | 0.0 | 0.0 | 0.0 |

| Conditional expressions | Focal length | | | | | | | | | |
|---|---|---|---|---|---|---|---|---|---|---|
| | 36.46 | 39.22 | 42.39 | 46.10 | 50.58 | 56.09 | 63.09 | 72.23 | 84.55 | Telephoto end 101.76 |
| (1) Ia/Ib | 1.212 | 1.212 | 1.212 | 1.212 | 1.212 | 1.212 | 1.212 | 1.212 | 1.212 | 1.212 |
| (2) dIc (%) | 3.5 | 3.7 | 3.8 | 3.9 | 4.0 | 3.9 | 3.8 | 3.7 | 3.5 | 3.2 |
| (3) Ic/Ib | 1.03 | 1.04 | 1.04 | 1.04 | 1.04 | 1.04 | 1.04 | 1.04 | 1.03 | 1.03 |
| (4) Ie/Ia | 0.875 | 0.884 | 0.897 | 0.916 | 0.939 | 0.961 | 0.986 | 1.006 | 1.017 | 1.016 |
| (5) arctan{(Ia/2)/fw} | | | | | | | | | | |
| (6) z | | | | | | | | | | |
| Ia | 34.51 | 34.51 | 34.51 | 34.51 | 34.51 | 34.51 | 34.51 | 34.51 | 34.51 | 34.51 |
| Ib | 28.47 | 28.47 | 28.47 | 28.47 | 28.47 | 28.47 | 28.47 | 28.47 | 28.47 | 28.47 |
| Ic | 29.45 | 29.51 | 29.56 | 29.59 | 29.60 | 29.59 | 29.56 | 29.52 | 29.45 | 29.38 |
| Ie | 30.18 | 30.50 | 30.95 | 31.60 | 32.40 | 33.16 | 34.04 | 34.82 | 35.10 | 35.06 |
| Amount of distortion after correction (%) | 0.0 | 0.0 | 0.0 | 0.0 | 0.0 | 0.0 | 0.0 | 0.0 | 0.0 | 0.0 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-084278, filed Apr. 21, 2017, which is hereby incorporated by reference herein in its entirety.

What is claimed is:

1. A distortion correction method of correcting distortion, where Ia represents a diagonal length of an effective pixel area of an image pickup element that receives light from an optical system, Ic represents a diagonal length of a first area, which is inside the effective pixel area, of the image pickup element, and Ib represents a diagonal length of a second area, which is inside the first area, of the image pickup element, the distortion correction being performed to obtain image data corresponding to the second area of the image pickup element, the distortion correction being performed to obtain image data corresponding to the second area for an image pickup mode, the method comprising:
satisfying a conditional expression 1.05<Ia/Ib; and
satisfying a conditional expression 1.0<Ic/Ib to correct distortion for data of an image having a positive distortion so that image information corresponding to an image height of Ic/2 becomes image information corresponding to an image height of Ib/2.

2. The distortion correction method according to claim 1, wherein the obtained image data is motion image data.

3. The distortion correction method according to claim 1, wherein the optical system does not include an extender.

4. The distortion correction method according to claim 1, further comprising satisfying a conditional expression 0.90<Ie/Ia, where Ie represents a diameter of an effective image circle of the optical system.

5. The distortion correction method according to claim 1, wherein the distortion correction is performed for data of an image having a positive distortion to generate image information corresponding to an image height of y based on image information corresponding to an image height of x, which is smaller than y, in a mode where an image pickup is performed with an image pickup area of the image pickup element at a resolution higher than that in the image pickup mode.

6. The distortion correction method according to claim 1, wherein the distortion correction is performed in a case where an amount of light at a periphery of an image circle satisfies an allowable condition thereof.

7. A distortion correction apparatus comprising:
an image processor configured to correct distortion, where Ia represents a diagonal length of an effective pixel area of an image pickup element that receives light from an optical system, Ic represents a diagonal length of a first area, which is inside the effective pixel area, of the image pickup element, and Ib represents a diagonal length of a second area, which is inside the first area, of the image pickup element, the distortion correction being performed to obtain image data corresponding to the second area of the image pickup element, to obtain image data corresponding to the second area for an image pickup mode, wherein the image processor, during the distortion correction:

satisfies a conditional expression $1.05 < Ia/Ib$; and satisfies a conditional expression $1.0 < Ic/Ib$ to correct distortion for data of an image having a positive distortion so that image information corresponding to an image height of $Ic/2$ becomes image information corresponding to an image height of $Ib/2$.

8. An image pickup apparatus comprising:

a zoom lens including a lens unit closest to an object side and providing a positive refractive power;

an image pickup element configured to pickup an image formed by the zoom lens; and a distortion correction apparatus comprising:

an image processor configured to correct distortion, where Ia represents a diagonal length of an effective pixel area of an image pickup element that receives light from an optical system, Ic represents a diagonal length of a first area, which is inside the effective pixel area, of the image pickup element, and Ib represents a diagonal length of a second area, which is inside the first area, of the image pickup element, the distortion correction being performed to obtain image data corresponding to the second area of the image pickup element, to obtain image data corresponding to the second area for an image pickup, wherein the image processor, during the distortion correction:

satisfies an expression $1.05 < Ia/Ib$; and satisfies a conditional expression $1.0 < Ic/Ib$ to correct distortion for data of an image having a positive distortion so that image information corresponding to an image height of $Ic/2$ becomes image information corresponding to an image height of $Ib/2$.

9. The image pickup apparatus according to claim 8, wherein following conditional expressions are further satisfied:

$36.0° < \arctan\{(Ia/2)/fw\}$; and $4.0 < z$, where fw represents a focal length of the zoom lens at a wide angle end, and z represents a zoom ratio of the zoom lens.

10. The image pickup apparatus according to claim 8, wherein the zoom lens is interchangeable with another zoom lens including a lens unit closest to an object side and providing a positive refractive power.

11. A distortion correction method of correcting distortion, wherein conditional expressions $1.05 < Ia/Ib$; and $1.0 < Ic/Ib$ are satisfied, where Ia represents a diagonal length of an effective pixel area of an image pickup element, the image pickup element receiving light from an optical system, Ic represents a diagonal length of a first area, which is in the effective pixel area, of the image pickup element, and Ib represents a diagonal length of a second area, which is in the first area, of the image pickup element, wherein the method obtains image data corresponding to the second area of the image pickup element by correcting distortion for data of an image having a positive distortion so that image information corresponding to an image height of $Ic/2$ becomes image information corresponding to an image height of $Ib/2$.

12. A distortion correction apparatus comprising:

an image processor configured to correct distortion; and a memory configured to store information used by the image processor, wherein conditional expressions $1.05 < Ia/Ib$; and $1.0 < Ic/Ib$ are satisfied, where Ia represents a diagonal length of an effective pixel area of an image pickup element, the image pickup element receiving light from an optical system, Ic represents a diagonal length of a first area, which is in the effective pixel area, of the image pickup element, and Ib represents a diagonal length of a second area, which is in the first area, of the image pickup element, wherein the processor is configured to obtain image data corresponding to the second area of the image pickup element by correcting distortion for data of an image having a positive distortion so that image information corresponding to an image height of $Ic/2$ becomes image information corresponding to an image height of $Ib/2$.

13. An image pickup apparatus comprising:

a distortion correction apparatus of claim 12; and the image pickup element configured to pick up an image formed by the optical system.

14. The image pickup apparatus according to claim 13, further comprising the optical system.

* * * * *